United States Patent [19]
Takahashi et al.

[11] Patent Number: 4,837,812
[45] Date of Patent: Jun. 6, 1989

[54] DUAL CONNECTION MODE EQUIPPED COMMUNICATION CONTROL APPARATUS

[75] Inventors: Shuichi Takahashi, Sagamihara; Takaho Koshiishi, Tokyo, both of Japan

[73] Assignee: Ricoh Company, Ltd., Tokyo, Japan

[21] Appl. No.: 172,084

[22] Filed: Mar. 23, 1988

Related U.S. Application Data

[63] Continuation-in-part of Ser. No. 943,787, Dec. 19, 1986, abandoned.

[30] Foreign Application Priority Data

Dec. 21, 1985 [JP] Japan ............................ 60-286911
Mar. 23, 1987 [JP] Japan ............................ 62-65785

[51] Int. Cl.⁴ .................. H04N 1/32; H04M 11/00; G06F 13/00
[52] U.S. Cl. ...................... 379/98; 358/257; 379/100
[58] Field of Search ............ 358/256, 257, 286, 85; 379/98, 100; 178/75, 74, 4.1 A, 4.1 R, 4 R, 3 R, 2 R; 364/521

[56] References Cited
U.S. PATENT DOCUMENTS

| | | | |
|---|---|---|---|
| 2,248,887 | 7/1941 | Milnor | 358/256 |
| 4,185,166 | 1/1980 | Kinch | 178/4 |
| 4,432,090 | 2/1984 | da Silua | 178/4 |
| 4,454,593 | 6/1984 | Fleming | 364/521 |
| 4,463,417 | 7/1984 | Bushaw | 379/100 |
| 4,485,400 | 12/1984 | Lemelson | 358/85 |
| 4,567,322 | 1/1986 | Tsuda | 358/256 |
| 4,661,659 | 4/1987 | Nishimura | 379/96 |
| 4,667,252 | 5/1987 | Nakamura | 358/286 |
| 4,746,986 | 5/1988 | Tanigawa | 358/256 |

*Primary Examiner*—Howard W. Britton
*Attorney, Agent, or Firm*—Oblon, Spivak, McClelland, Maier & Neustadt

[57] ABSTRACT

A facsimile machine including a data processing system for processing data to be transmitted and received data according to a predetermined manner, which system typically comprises a MODEM, a buffer and a CODEC. The facsimile machine includes two or more interface units dedicated for performing a wire communication function for communicating image data in a wire communication mode using a telephone network and a radio communication function for communicating image data in a radio or wireless communication mode using radio waves. The radio/wire switchable facsimile machine includes a switch which switchingly establishes the wire mode or the radio mode. In one embodiment, the switch is manually operated. In a second embodiment the switch automatically establishes either one of the wire and radio modes in accordance with the current status of a predetermined signal, typically an off-hook signal, which indicates whether the handset of a telephone unit is hooked or unhooked or whether the microphone of a radio set is hooked or unhooked.

10 Claims, 10 Drawing Sheets

DUAL CONNECTION MODE EQUIPPED COMMUNICATION CONTROL APPARATUS

CROSS REFERENCE TO RELATED APPLICATIONS

This application is a continuation-in-part of U.S. application Ser. No: 06/943,787 filed Dec. 19, 1986, now abandoned.

BACKGROUND OF THE INVENTION

1. Field of the Invention

This invention generally relates to a communication control apparatus, and, in particular, to a dual connection mode equipped communication control apparatus capable of selectively establishing a connection with or without wire. More specifically, the present invention relates to a dual mode connectable facsimile machine which can selectively carry out communication with or without wire.

2. Description of the Background

A communication between two terminal stations may be carried out either by a wire communication method or a radio communication method. However, there is no data communication apparatus which can be used for either of these two communication methods selectively. Thus, there has been a need to provide a communication control apparatus which can be used for communication with or without wire, selectively.

Facsimile machines may be categorized into two groups depending on whether they use a transmission line, such as telephone network, or they rely on radio waves. That is, a wire facsimile machine is a facsimile machine which uses a transmission line for transmission of data, and a radio or wireless facsimile machine is a facsimile machine which uses radio waves as a carrier for transmission of data. In general, in the wire facsimile machine, transmission of image information is carried out in a standard communication procedure and communication mode based on the CITT recommendations; whereas, in the radio facsimile machine, use if often made of a non-standard communication procedure established by each manufacturer in order to cope with a typical high rate of occurrence of communication errors.

It has been desired to integrate a wire facsimile machine and a radio machine into a single facsimile machine capable of selectively carrying out communication of image information either in a wire mode or a wireless mode.

SUMMARY OF THE INVENTION

Accordingly, it is a primary object of the present invention to obviate the disadvantage of the prior art and to provide a novel communication control apparatus having dual connection modes.

Another object of the present invention is to provide a communication control apparatus which allows to carry out communication using either a wire communication network or a radio communication network.

A further object of the present invention is to provide a data communication apparatus which can be selectively used as a terminal of a wire network or a radio network.

A still further object of the present invention is to provide a facsimile machine which can be used as a terminal of a wire network or a radio network.

Another object of the present invention is to provide an improved facsimile machine capable of selectively establishing a wire facsimile mode of operation or a radio facsimile mode of operation automatically.

A further object of the present invention is to provide an improved integrated facsimile machine having both of wire and radio communication functions.

A still further object of the present invention is to provide an improved facsimile machine high in performance, simple in structure and easy to use.

These and other objects are achieved according to the invention by providing a new and improved communication control apparatus which includes first interface means connected to a wire network, second interface means connected to a radio set, communication means for transmitting and receiving data, and controlling means for controlling said communication means to be connected selectively to either one of said first and second interface means. With this structure, the communication control apparatus can selectively carry out communication either using the wire network or the radio network. That is, the first interface means takes care of an interface between the communication means and the wire network, and the second interface provides an interface between the communication means and the radio set.

In a preferred embodiment, there is provided a new and improved radio/wire switchable facsimile machine which can automatically set a radio facsimile mode or a wire facsimile mode in accordance with a predetermined signal. In one embodiment, use is made of an off-hook signal, which indicates whether a telephone connected to the facsimile machine is in an off-hook state or not, for determining whether to establish the radio mode or wire mode. For example, when the off-hook signal has been detected to take a first state, indicating the fact that the handset of a telephone has been removed from its cradle or hook, the wire facsimile mode is automatically established. On the other hand, when the off-hook signal has been the detected to take a second state, indicating the fact that the handset is placed its cradle or hook the radio facsimile mode is automatically established. In this manner, either one of the two modes of radio and wire facsimile communication can be automatically selected. As an alternative, the off-hook signal may indicate whether the microphone of the radio set is in an off-hook state or not. As a further alternative embodiment, use may be made of any other signal for determining the mode of operation of the present integrated facsimile machine.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

At the outset, it is to be noted that the term "data" used in the present specification should be construed to embrace the meaning of digital data and also analog data, such as facsimile image information and audio or sound information.

In the case when a data communication is to be carried out using a wire communication network, such as a public telephone network, the data to be transmitted through such a wire network must be adapted to the characteristic, such as modulation to a carrier wave adaptable to a particular frequency band, of the wire network. In the case of a telephone network, this frequency band is set, for example, between approximately 300 Hz and 3 kHz. At the receiver, the data received must be demodulated before being recorded on a sheet of recording paper. In the case of radiotelephony in which two-way transmission of sounds is carried out by means of modulated radio waves without interconnecting wires, a sound signal to be transmitted is input into a microphone of a radio set which converts the sound signal into an electrical signal which in turn is, for example, subjected to FM modulation so as to be adapted to a particular transmission characteristic or frequency band of the radio set before transmission of radio waves into the air. In this case, also, the input voice signal is converted into a signal which is suitable for the input characteristic of the radio set and thus has an audio frequency range between approximately 300 Hz and 3 kHz.

As described above, for a compact communication apparatus which can be used not only as a terminal of a public telephone network, but also as a terminal of a radiotelephone network, it is advantageous to carry out input and output of data in an audio frequency band. Under such circumstances, once the communication apparatus is connected to either of a wire network or a wireless network, the transmission and reception of data between the transmitter and the receiver can be carried out in the same manner using the same components. Thus, there remains differences only in the structure for establishing a connection between the communication apparatus and the network depending on whether or not the network uses wire. As a result, in accordance with the principle of the present invention, there is provided a communication control apparatus including separate interface units for wire communication and wireless communication.

Figure 1:
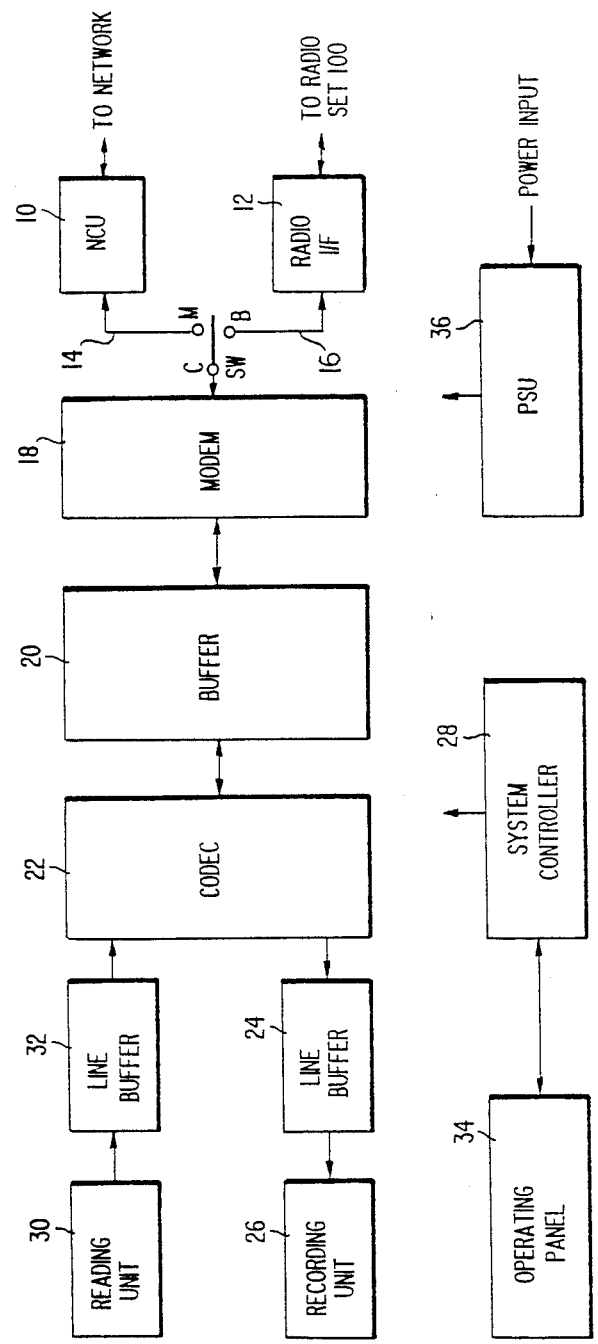
FIG. 1 is a functional block diagram showing the overall structure of a facsimile machine constructed in accordance with one embodiment of the present invention.

Referring now to the drawings, wherein like reference numerals designate identical or corresponding parts throughout the several views, and more particularly to FIG. 1 thereof, there is shown in functional block form a facsimile machine which can selectively be used for wire communication and wireless communication and which is constructed in accordance with one embodiment of the present invention. As shown, the present facsimile machine includes a net control unit (NCU) 10 which has a function for establishing a connection between the present facsimile machine and a wire communication network, such as a public telephone network. In the illustrated embodiment, the net control unit 10 serves as an interface between the present facsimile machine and the public telephone network and thus it is equipped with functions to set up required technical conditions, physical conditions and technical standards for transmitting and receiving data through the public telephone network, as well known for one skilled in the art. These conditions include input/output impedance conditions, d.c. conditions, dielectric resistance conditions and network conditions.

The present facsimile machine also includes a radio interface unit 12 which allows the present facsimile machine to be connected to a radio communication network through a radio set 100 (FIG. 3), such as a radiotelephone. The radio set 100 may be a terminal in a multichannel access (MCA) communication network, which has constraints in the length of time of usage. The radio interface unit 12 is so structured to satisfy various technical conditions, physical conditions and technical standards required for connection to such a radio set 100. These conditions include input/output level conditions, input/output impedance conditions and network conditions.

An input/output line 14 extends from the network control unit 10 to a contact point M of a switch SW and an input/output line 16 extends from the radio interface unit 12 to a contact point B of the switch SW. The switch SW has a movable arm pivoted at point C which is connected to a MODEM 18, which in turn is connected to a CODEC 22 through a buffer 20. The MODEM 18 has a function of modulating a facsimile data, typically image data, into a signal having an audio frequency range. The buffer 20 is a memory serving to store temporarily facsimile data to be transmitted or received.

The CODEC 22 is a device in which a facsimile signal to be transmitted is arranged in the form of a predetermined frame and compressed using run-lengths according to a predetermined encoding method and a received facsimile signal is deframed and decoded to reconstruct the original facsimile signal according to a predetermined decoding method. In this case, typically, a normality check of a received signal, such as a CRC check, is also carried out. In the preferred embodiment, encoding methods, decoding methods, modulating methods and demodulating methods according to the G3 standards of CCITT recommendations can be advantageously applied to the MODEM 18 and the CODEC 22.

The received facsimile data once stored in the buffer 20 is read out into the CODEC 22, from which the data is stored into a line buffer 24. The data is then transferred from the line buffer 24 to a recording unit 26, where the data is recorded on a sheet of recording medium. The recording unit 26, for example, includes a thermal printhead comprised of a plurality of heat-producing elements arranged in the form of an array, a laser printer or any other desired devices. Although such a mechanism as a transport control unit for the sheet of recording medium is not shown, its movement is for example controlled by a pulse motor under the control of a system controller 28. Of course, the recording unit 26 may also include an image displaying device, such as a CRT, if desired.

On the other hand, facsimile data to be transmitted are obtained by optically reading an original document in the form of raster scanning by a reading unit 30 including, for example, an image sensor comprised of a plurality of photoelectric elements arranged in the form of an array. The facsimile data thus obtained are then converted into a binary image signal by a thresholding operation, and the thus converted binary image signal is then stored into a line buffer 32. The facsimile data are then transferred to the buffer 20 through the CODEC 22, where the facsimile data are compressed by encoding.

The functions and operations of the various components of the present facsimile machine described above are integrally controlled by a system controller 28 which is preferably comprised of a microprocessor. The system controller 28 is in charge of various controls required for the operation of the present facsimile machine, such as data control and communication procedure control, as well as the controls of various components of the present facsimile machine. Since the present machine is so structured to be capable of carrying out both of wire and wireless communications, the system controller 28 is provided with control functions in the form of software required for both such communication methods.

Connected to the system controller 28 is an operating panel 34 which is typically provided with various keys and buttons, which are operated by the operator, and indicators or display units, indicating the status of the machine and the network. A power supply unit (PSU) 36 is also provided in the present facsimile machine for supplying power to the above-described various components. It is to be noted that control lines extending among the system controller 28, the power supply unit 36 and various other components are omitted from FIG. 1 so as to avoid crowding of the figure.

The switch SW in the present embodiment has a function of selecting a wire communication mode using the telephone network through the net control unit 10, or a wireless communication mode using the radio set 100 through the radio interface unit 12. In the first embodiment shown in FIG. 1, the status of the switch SW is determined by operating a corresponding button on the operating panel 34. It is to be noted that a transmission signal TX and a reception signal RX are mainly transmitted through the switch SW and the switch SW is shown in FIG. 1 to represent conceptually switching between transmission mode and reception mode by a single switch. It may also be so structured that various signals required for the interface units 10 and 12 are transferred through the switch SW. Besides, the switch SW is preferably comprised of an electronics switch.

When the wire communication mode is selected by operating the operating panel 34, the system controller 28 responds to this selection and causes the switch SW to be connected to the contact point M, so that the network control unit 10 is connected to the MODEM 18. On the other hand, if the wireless or radio communication mode is selected by operating the operating panel 34, the system controller 28 responds to this selection and causes the switch SW to be connected to the contact point B, thereby establishing a connection between the radio interface unit 12 and the MODEM 18.

Figure 2:
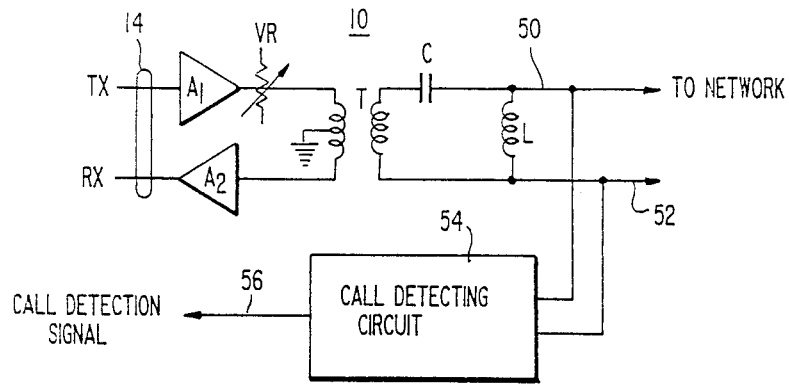
FIG. 2 is a circuit diagram showing the detailed structure of one embodiment of the net control unit 10 provided in the facsimile machine shown in FIG. 1.

Referring now to FIG. 2, the detailed structure of one embodiment of the net control unit 10 is shown. A transmission signal TX and a reception signal RX on the signal line 14 are input into and output from the net control unit 10, respectively. These signals TX and RX are coupled to a facsimile side winding of a hybrid transformer T through amplifiers A1 and A2 and a variable resistor VR. The transformer T has a network side winding which is connected to a series connection including a d.c. component removing capacitor C and a coil L providing a d.c. holding function. A pair of network terminals 50 and 52, each connected at the corresponding end of the coil L, is provided and a public telephone network is connected thereto. The hybrid transformer T, capacitor C and coil L are so structured to satisfy the technical standards of the public telephone network. The transmission signal TX is amplified to a predetermined level by the amplifier A1 and, after having been adjusted to an appropriate level by the variable resistor VR, input into the transformer T, from where the signal is transferred to the network. The signal from the amplifier A1 is not input into the other amplifier A2 substantially or at all. On the other hand, a signal from the network is processed through the transformer T and then through the amplifier A2 to be output as a reception signal RX having a predetermined level. It should also be noted that, in addition to the transmission and reception signals TX and RX, respectively, unique control signals required for communication through the telephone network are also exchanged between the network control unit 10 and the system controller 28.

Also provided is a call detecting unit 54 as connected to the pair of network terminals 50 and 52. Unit 54 detects a call or ringing signal supplied from the transmitter or the central station of the network. As well known in the art, the call signal is an a.c. signal for exciting a buzzer of a telephone receiver. In the case of a telephone receiver, communication can be made by lifting a receiver to establish an off-hook condition. In the case of a facsimile machine, this call signal is used as a control signal for detection of a call. In the present embodiment, an output signal 56 from the call detecting circuit 54 is supplied to the system controller 28 as a call detection signal. In response to this call detection signal, the system controller 28 carrie out an automatic call control procedure, i.e., a control procedure for establishing connection to the facsimile machine. It should be noted that the net control unit 10 includes all of the functions necessary for controlling communication using the public telephone network, but those portions which are not necessary for understanding the principle of the present invention have been omitted for the sake of brevity.

Figure 3:
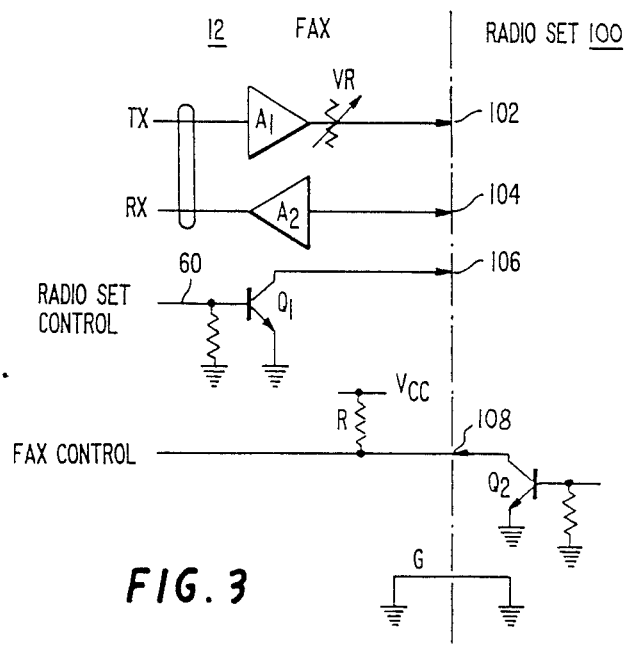
FIG. 3 is a circuit diagram showing the detailed structure of one embodiment of the radio interface unit 12 provided in the facsimile machine shown in FIG. 1.

Referring now to FIG. 3, the detailed structure of one embodiment of the radio interface unit 12 is shown. As shown, a transmission signal TX and a reception signal RX on the signal line 16 is input into and output from the radio interface unit 12 through the switch SW, respectively. The transmission signal TX is coupled to a microphone input terminal 102 of the radio set through an amplifier A1 and a variable resistor VR. This transmission signal TX is amplified to a predetermined level by the amplifier A1 and adjusted to a level suitable for input into a microphone when output from the radio interface unit 12. On the other hand, a signal received by the radio set 100 is adjusted in level to a level suitable for input into the radio interface unit 12 and input into an amplifier A2 from an output terminal 104 of the radio set 100. This signal is amplified by the amplifier A2 to a signal level suitable for the present facsimile machine or its impedance is matched, and it is output onto the signal line 16 as a reception signal RX. It should also be noted that, in addition to the transmission and reception signals TX and RX, unique control signals necessary for communication using the radio set 100 are exchanged between the radio interface unit 12 and the system controller 28.

A radio set control signal from the system controller 28 is coupled to a control line 60 and supplied to a control input terminal 106 of the radio set 100 though a transistor Q1. This signal serves to apply a low level signal to the control input terminal 106 of the radio set 100 by rendering the transistor Q1 conductive during a time period in which the transmission signal TX is transmitted from the present facsimile machine. In the present embodiment, the radio set 100 is normally in the receiving mode, but it is set in the transmission mode only when a low level signal is applied to the control input 106. Thus, when the system controller 28 supplies a high level radio set control signal to the control line 60, the radio set 100 is set in the transmission mode, and during a time period in which the control signal is at high level, the transmission signal TX is supplied to the signal line 16 after originating from the reading unit 30 and being processed through those elements, including CODEC 22, MODEM 18 and switch SW.

A fax control signal is supplied from an output terminal 108 of the radio set 100 to the radio interface unit 12. This signal corresponds to the above-mentioned call detection signal in the net control unit 10, and thus the output terminal 108 is activated when a call has been placed to the present facsimile machine from another station. This fax control signal is supplied to the system controller 28 via a control line 62 of the radio interface unit 12, and, in response thereto, the system controller 28 carries out an automatic call processing procedure.

The above-described embodiment has typical functions required for wire and wireless communication modes. There may be a case, however, which requires unique control signals depending on the type of communication. In order to cope with such a case, it is preferable that the system controller 28 be structured to contain an interface for handling such unique control signals and software therefor in advance if it is known previously. In this manner, in accordance with the principle of the present invention, the same communication apparatus can be used commonly for different modes of communication simply by providing an interface unit dedicated for a particular mode of communication and its associated software.

Figure 4:
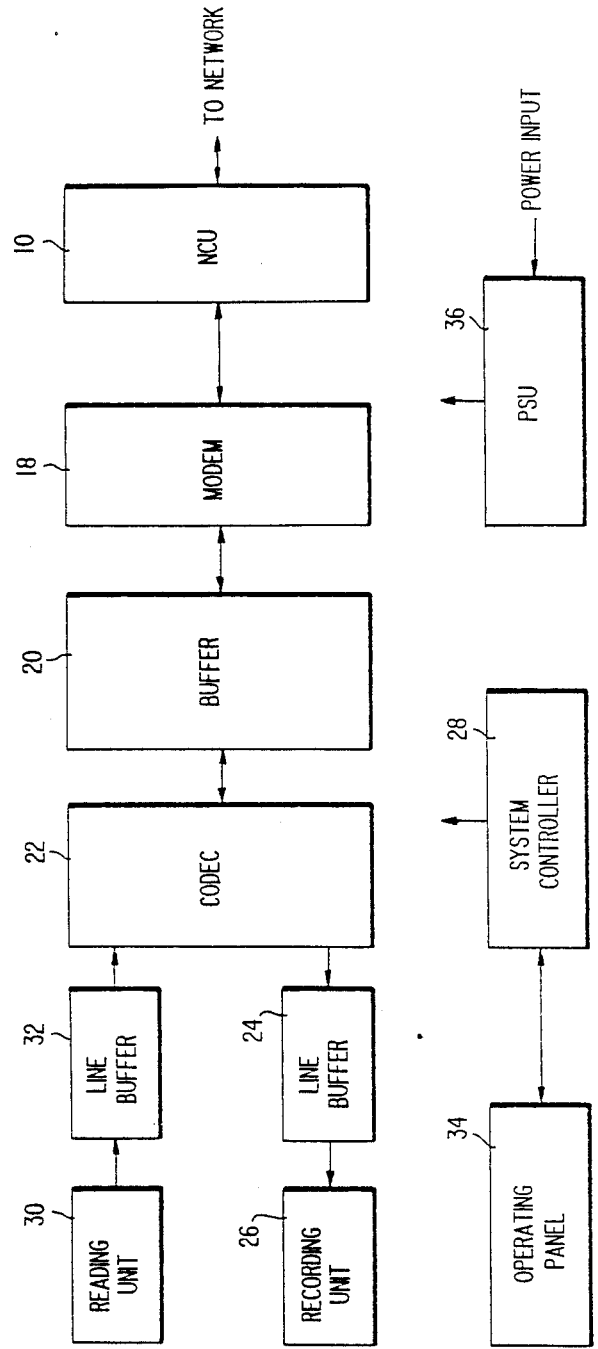
FIG. 4 is a functional block diagram showing the overall structure of a typical prior art facsimile machine for use with wire communication.

For the purpose of comparison with the present invention, FIG. 4 shows the overall structure of a typical prior art facsimile machine. In FIG. 4, those elements corresponding to those shown in FIG. 1 are indicated by identical numerals. This prior art facsimile machine is structured to be exclusively connected to a public telephone network, and thus its MODEM 18 is fixedly connected to its network control unit 10, which is different from the present invention as described above. As can be understood from this comparison, in accordance with the present invention, data processing components, such as recording unit 26, CODEC 22 and MODEM 18, other than an interface unit in charge of establishing connection between the communication unit and a particular communication network are shared and commonly used. Thus, even if the communication apparatus is structured to be applicable to two or more different modes of communication, such as wire communication and wireless communication, the overall structure of the communication apparatus can be maintained compact in size and low in cost. It is to be noted that the present invention is applicable to any type of data communication apparatus other than a facsimile machine described above.

Figure 5:
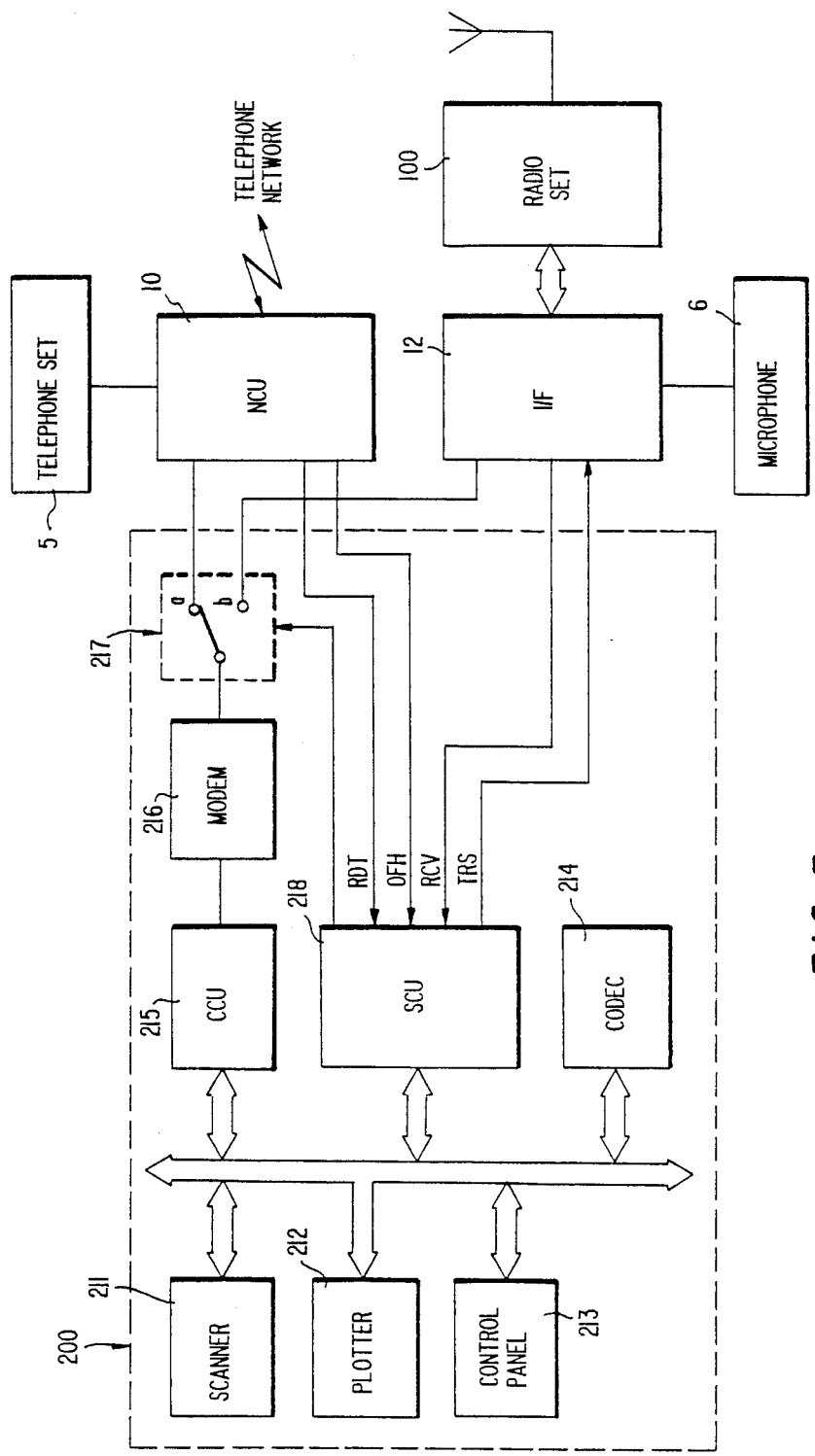
FIG. 5 is a block diagram showing the overall structure of a radio/wire switchable facsimile machine constructed in accordance with another embodiment of the present invention.

Referring now to FIG. 5, there is schematically shown a radio/wire switchable facsimile machine constructed in accordance with another embodiment of the present invention. As shown, the illustrated facsimile machine includes a facsimile main system 200 which may be operatively connected to a telephone network through a net control unit or simply NCU 10 or to a radio set 100 for carrying out communication using radio waves through an interface unit 12. In the illustrated embodiment, NCU 10 is of the manual calling and automatic receiving connection type, i.e., the so-called MA type, and an external telephone unit 5 is connected to NCU 10. On the other hand, a microphone 6 is connected to the interface unit 12 to which is also connected a radio set 100. The interface unit 12 serves to connect the facsimile main system 200 or the microphone 6 to the radio set 100 selectively.

The facsimile main system 200 includes a scanner 211, which optically reads an original to be transmitted at a predetermined resolution, and a plotter 212 which records received image information at a predetermined resolution. Also provided in the facsimile main system 200 is a control panel 213 which is provided with various operational keys and a large display having a high degree of freedom in displaying various operational guidance information or the like. The operator can give various operational instructions to the facsimile main system 200 through this control panel 213. The facsimile main system 200 also includes a CODEC 214 which compressor image data by coding and decompresses the compressed image data by decoding thereby to restore the original uncompressed image data. A communication control unit or simply CCU 215 is also provided and executes a communication control procedure based on CCITT recommendations T.30 in the case of a wire communication mode using a telephone network, while it executes another communication control procedure, which will be described later in detail, in the case of a wireless or radio communication mode using the radio set 100.

A MODEM 216 is also provided and includes a low-speed MODEM function for transmission of communication procedure data and a high-speed MODEM function for transmission of image information data. Both of these functions are selectively used as switched by the communication control unit or CCU 215. As the low-speed MODEM function, use may be made, for example, of 300 bps as specified at CCITT recommendations V.21; on the other hand, use may be made of 4,800 bps as specified in CCITT recommendations V.27 as the high-speed MODEM function. However, in the illustrated embodiment, during image transmission in the radio communication mode, the high-speed MODEM function operates only at a single predetermined transmission rate and the transmission rate does not change to a lower fall-back rate. Also provided in the main facsimile system 200 is a switch circuit 217 which includes a movable, common contact connected to the MODEM 216, a wire contact a connected to NCU 10, and a radio contact b connected to the radio interface unit 12. Thus, the MODEM 216 may be operatively connected to NCU 10 or to radio interface unit 12 by the switch circuit 217.

A system control unit or simply SCU 218, which is also provided in the main facsimile system 200, is in charge of detection of receipt of a call either through the telephone network or the radio set 100, switching of the switch circuit 217, switching between transmission and reception modes of the radio set 100, etc. Thus, SCU 218 controls the operation of the associated units provided in the main facsimile machine 200 thereby to carry out transmission or reception of image information either in the wire communication mode or in the radio communication mode. For this purpose, SCU 218 receives a call reception detection signal RDT, which takes an "ON" state when a call has been received through the telephone network, an off-hook signal OFH, which takes an "ON" state when NCU 10 is operating in a calling mode, and an individual reception signal RCV, which takes an "ON" state when the radio set 100 has been called. As shown in FIG. 5, both of the RDT and OFH signals are supplied from NCU 10 and the RCV signal is supplied from the radio interface unit 12. On the other hand, a transmission designation signal TRS, which takes an "ON" state during transmission of data, is supplied from the SCU 218 to the radio interface unit 12.

Figure 6:
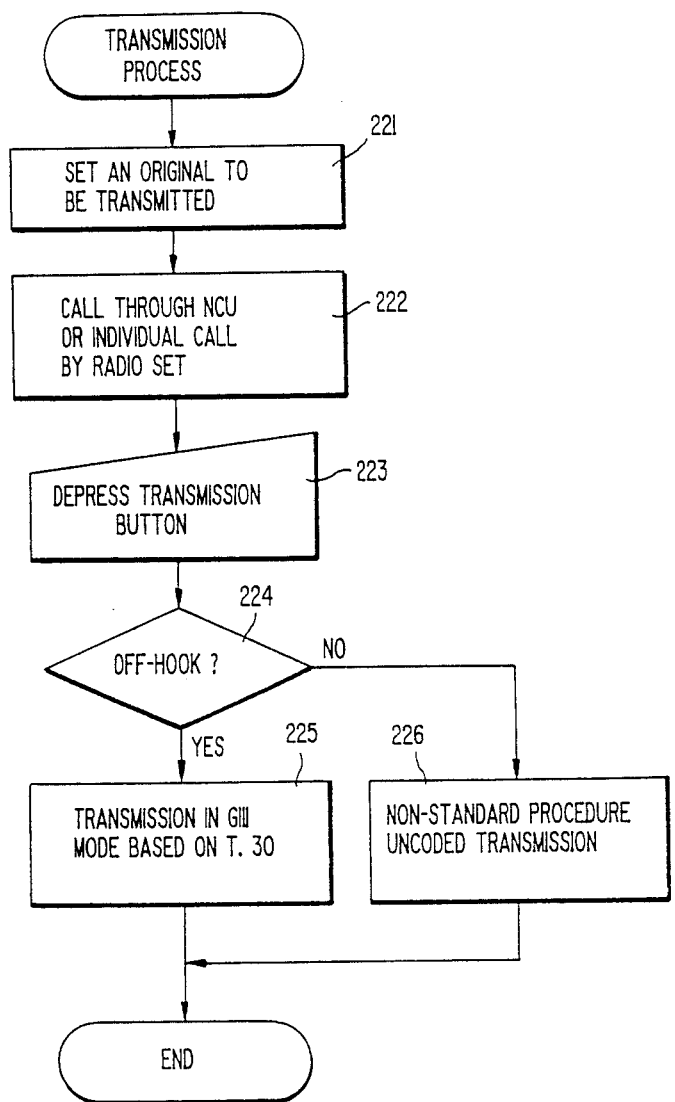
FIG. 6 is a flow chart showing the sequence of steps of a transmission process which may be carried out by the facsimile machine shown in FIG. 5.

With the above-described structure, next described is the case of communicating image data between two radio/wire switchable facsimile machines of the present embodiment. In the first place, if it is desired to transmit image data through the telephone network, the operator at a transmitter station TX sets an original to be transmitted at the scanner 211 as shown as step 221 in the flow chart of FIG. 6. Then, the operator picks up the handset of the telephone unit 5 and dials the telephone number of a destination station RX (step 222). When the facsimile machine of the destination station RX responds, the operator then depresses a transmission button provided at the control panel 213 (step 223). Of importance, when the operator picks up the handset of the telephone unit 5, the off-hook signal OFH which is being input from NCU 10 to SCU 218 takes an "ON" state. It should be understood that the off-hook signal OFH can take either one of the two predetermined states, i.e., "ON" and "OFF" states. For example, the "ON" state may be defined as a low state and the "OFF" state may be defined as a high state. The SCU 218 determines whether the off-hook signal OFH is currently in the "ON" state or the "OFF" state (step 224), and, if the off-hook signal OFH has been determined to be in the "ON" state (i.e., the result of determination at step 224 is affirmative), the SCU 218 causes the switch circuit 217 to establish a connection with the wire contact a and then controls the CCU 215 to execute a predetermined communication control procedure based on CCITT recommendations T.30, G III format.

Figure 7:
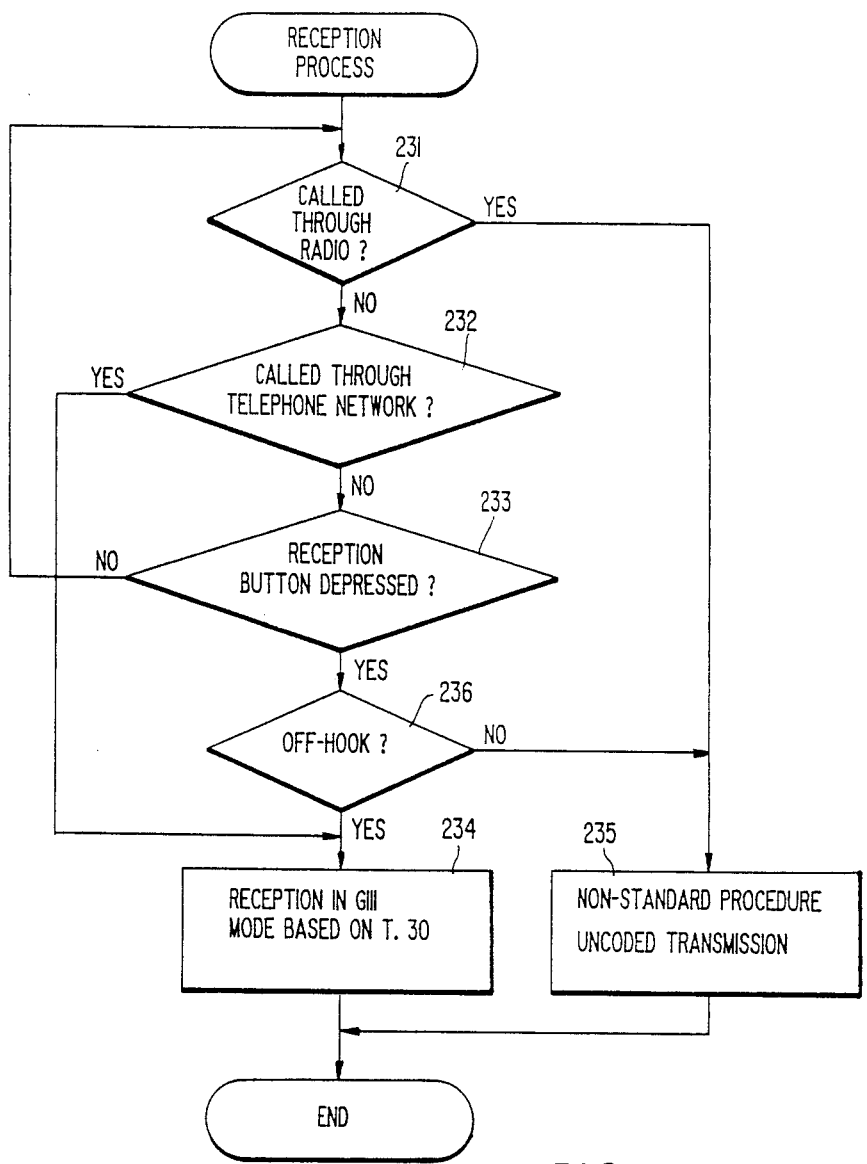
FIG. 7 is a flow chart showing the sequence of steps of a reception process which may be carried out by the facsimile machine shown in FIG. 5.

On the other hand, the main facsimile system 200 of the receiver station RX is initially in a stand-by state. Under this condition, as shown in FIG. 7, the SCU 218 repetitively carries out detection of receipt of a call through the radio set 100 by the individual reception signal RCV from the radio interface unit 12 (step 231), detection of receipt of a call through the telephone network by the call reception detection signal RDT from NCU 10 (step 232) and detection of depression of a reception button at the control panel 213 (step 233). This sequence of detection steps defines a loop going from the negative branch of step 231 to step 232, from the negative branch of step 232 to step 233 and from the negative branch of step 233 to step 231. In the event that a call has been placed by the above-described transmitter TX, the NCU 10 receives such a call, thereby causing the call reception detection signal RDT to take the "ON" state. When the SCU 218 has determined that the signal RDT has taken the "ON" state, the SCU 218 controls the CCU 215 such that the CCU 215 executes a predetermined communication control procedure based on CCITT recommendations T.30, G III format.

Figure 8:
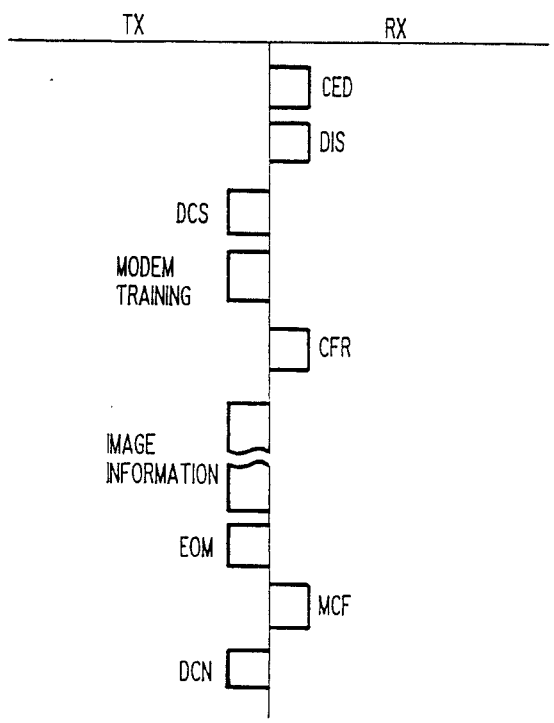
FIG. 8 is an illustration showing a communication control procedure for transmitting image information using a telephone network as a transmission line.

As a result, as shown in FIG. 8, a communication of image information can be carried out between the transmitter station TX and the receiver station RX in accordance with the well-known communication control procedure according to CCITT recommendations. That is, the receiver station RX sends a CED signal and a DIS signal thereby to apprise the transmitter station TX of the functions provided in the receiver station RX. Upon receipt of these signals, the transmitter station TX sends a DCS signal thereby to designate a communication mode and then a signal for carrying out MODEM training. Upon receipt of these signals, the receiver station RX establishes its internal condition appropriately, and, thereafter, the receiver station RX sends a CFR signal, which indicates a reception enable state. When the transmitter station TX has received this CFR signal, the scanner 211 optically reads the image information of an original to be transmitted, and the image information thus read is compressed by coding by the CODEC 214. The thus compressed image information is then modulated by the MODEM 216 and then transmitted to the receiver station RX through the telephone network. Upon completion of transmission of image information, an EOM signal, which indicates the end of transmission of image information, is supplied from the transmitter station TX to the receiver station RX.

At the receiver station RX, the thus received image information is demodulated by the MODEM 216, decompressed to the original image information by the CODEC 214 and then supplied to the plotter 212, where the image information is recorded on a sheet of recording paper. Upon completion of recording, the receiver station RX sends an MCF signal, which indicates safe receipt of image information, to the transmitter station TX. When the transmitter station TX has received this MCF signal, it sends a DCN signal, telling the receiver station RX to disconnect the transmission line, so that the transmission process is completed (step 225 in FIG. 6). On the other hand, upon receipt of the DCN signal, the receiver station RX terminates its reception process (step 234 in FIG. 7).

Next described is the case of image transmission carried out in the radio communication mode using the radio set 100. In this mode of operation, after setting an original to be transmitted in position (step 221 in FIG. 6), the operator at the transmitter station TX causes the radio interface unit 12 to be switched from the microphone 6 to the facsimile main system 200. And, while carrying out an individual calling of a particular receiver station RX through the operation of the radio set 100 (step 222), a transmission button provided at the control panel 213 of the facsimile main system 200 is depressed (step 213). Because of this individual call placing operation, the radio set 100 sends out a particular tone signal which corresponds to the particular receiver station RX. Under this condition, since the SCU 218 keeps the off-hook signal OFH from the NCU 10 in its "OFF" state (negative branch of step 224), the SCU 218 causes the switch circuit 217 to establish a connection to the radio contact b. In addition, the SCU 218 controls the CCU 215 such that the CCU 215 carries out a non-standard communication control procedure, which will be described later in detail.

Under such circumstances, the receiver station's radio set 100 receives the particular tone signal, so that the individual reception signal RCV which is being output to the SCU 218 through the radio interface unit 12 takes the "ON" state. When the SCU 218 detects the fact that the individual reception signal RCV is in its "ON" state (i.e., affirmative branch of step 231 in FIG. 7), the SCU 218 causes the switch circuit 217 to establish a connection to the radio contact b. At the same time, the SCU 218 causes the CCU 215 to execute a predetermined non-standard communication procedure as will be described in detail below.

Figure 9A:
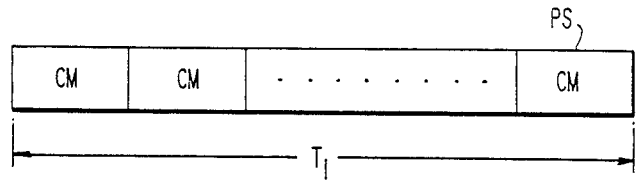
FIG. 9a is an illustration showing the signal format of a procedural signal which may be advantageously used in the present facsimile machine when it operates in a radio facsimile mode.
Figure 9B:
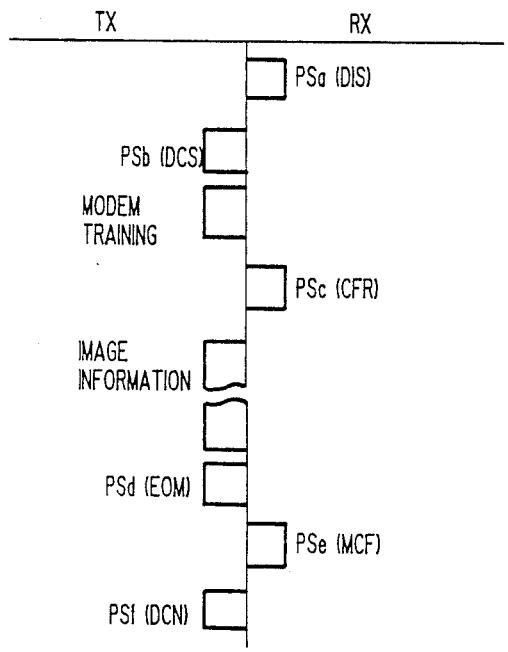
FIG. 9b is an illustration showing a communication control procedure for transmitting image information in a radio facsimile mode.

In the present non-standard communication procedure, there are five different kinds of procedural signals Psa through PSf which are communicated between the transmitter station TX and the receiver station RX, as shown in FIG. 9b. As shown in FIG. 9a, such a procedural signal PS has a format in which a command data CM comprised, for example, of eight bits, which indicate the contents of information, is transmitted continuously and repetitively for a predetermined period of time $T_1$ on the order of 1 second.

In the first place, as shown in FIG. 9b, the CCU 215 of the receiver station RX sends a procedural signal PSa, in which a command data CM indicating, for example, the size of recording paper set in position is set, whereby the information corresponding to that contained in the DIS signal in FIG. 8 is transmitted. Under this condition, since the transmitter station TX is also similarly set in a corresponding non-standard procedure, he transmitter station TX receives the same command data CM over a number of times repetitively for a predetermined time period of $T_1$. In this case, if all of the data received by the transmitter station are not identical, the contents of the data are determined on the basis of a majority rule. This process prevents erroneous operation even if transmission error has occurred during the radio communication mode, which is basically an error prone communication mode. For the following procedural signals PSb through PSf, such a determination is carried out at the receiver station RX. Then, the transmitter station TX sends the next procedural signal PSb, by which a command data CM corresponding in contents to the DCS signal shown in FIG. 8 is transmitted. Thereafter, a predetermined signal, indicating either "1" or "0", is transmitted for a predetermined period of time for the purpose of MODEM training. Upon execution of MODEM training, the receiver station RX sends the next procedural signal PSc which corresponds in contents to the CFR signal shown in FIG. 8.

Thereafter, in a manner similar to that in the case of FIG. 8, the transmitter station TX transmits image information. In this case, similarly as above, in order to minimize the effect of transmission errors, the image formation is transmitted without being coded or compressed, and, thus, the receiver station RX processes the received image information correspondingly. At the end of the image information, the transmitter station TX transmits another procedural signal PSd which corresponds in contents to the EOM signal in FIG. 8. Thereafter, the receiver station RX transmits a further procedural signal PSe which corresponds in contents to the MCF signal in FIG. 8. In response thereto, the transmitter station TX transmits a still further procedural signal PSf which corresponds in contents to the DCN signal in FIG. 8, thereby terminating the transmission process (from step 226 in FIG. 6 to step 235 in FIG. 7).

Now, a further mode of operation, in which a source station places a call to a destination station either through the telephone network or through the radio set 100 and the source station receives image information from the destination station, will be described. In this mode of operation, after calling the destination station, the operator at the source station requests the operator of the destination station to depress a transmission button of the facsimile main system 200 of the destination station through a telephone conversation, and, at the same time, the operator at the source station depresses a reception button of the source station. Under this condition, the SCU 218 of the source station detects the depression of the reception button (i.e., the affirmative branch of step 233 in FIG. 7) and determines the status of the off-hook signal OFH (step 236). And, if the off-hook signal OFH has been determined to be in its "ON" state (i.e., affirmative branch of step 236), a predetermined reception process is carried out in a standard communication control procedure through the telephone network; on the other hand, if the off-hook signal OFH has been determined to be in its "OFF" state (i.e., negative branch of step 236), a predetermined reception process is carried out in a non-standard communication control procedure through the radio set 100 (step 235).

In the above-described embodiment, the facsimile main system 200 includes the switch circuit 217 which may establish a connection to the NCU 10 connected to the telephone network or to the radio interface unit 12 connected to the radio set 100. And, during the transmission mode, whether to transmit image data in the wire communication mode or to transmit image data in the radio communication mode is determined depending on the current status of the off-hook signal OFH. On the other hand, during reception mode, the selection of either one of the wire and radio communication modes is automatically made depending on the current status of each of the call reception detection signal RDT and the individual reception signal RCV. Depending on the current status of each of these control signals, the SCU 218 supplies a switch control signal to the switch circuit 217, thereby establishing a connection to either one of the wire and radio contacts a and b. Thereafter, a corresponding communication control procedure is executed, which is followed by a process of transmission of image data. In the case where a source station, which has placed a call to a destination station, receives image data from the destination station, after depression of the reception button, the selection of either one of the wire and radio communication modes is carried out depending on the current status of the off-hook signal OFH.

Figure 10:
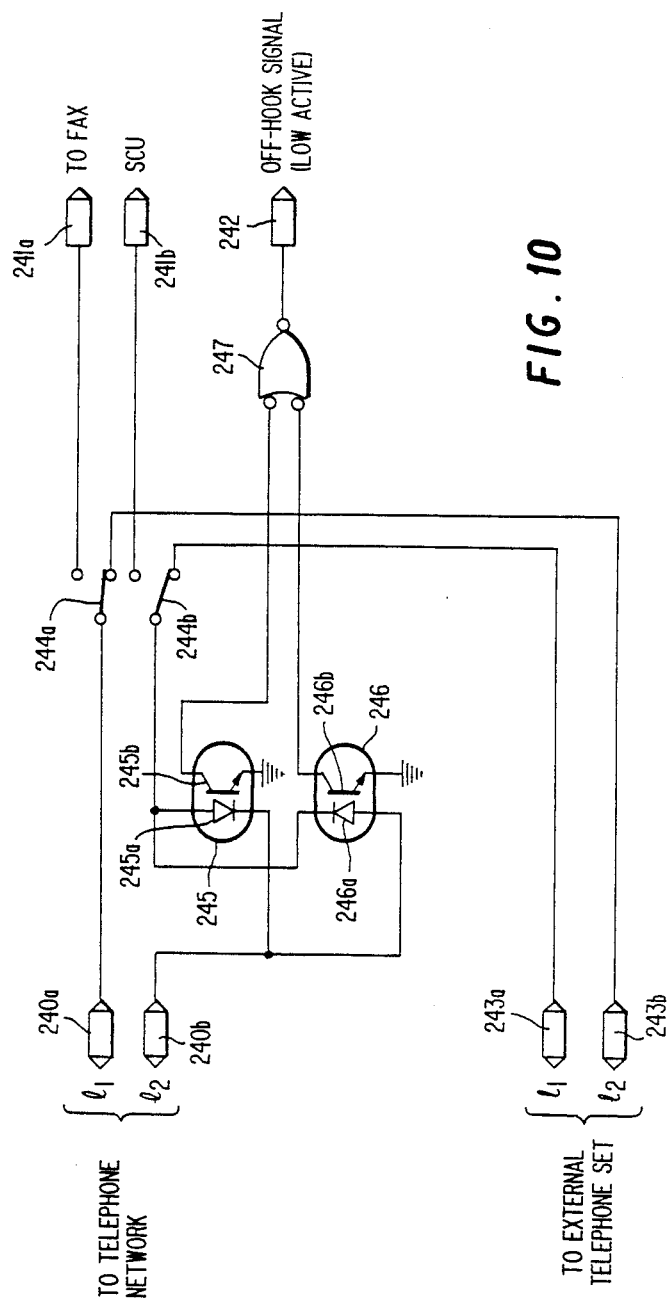
FIG. 10 is a circuit diagram showing part of the detailed circuit of the NCU which generates an off-hook signal.

Now, referring to FIG. 10, it is next described how an off-hook signal is produced. The structure schematically shown in FIG. 10 constitutes part of the NCU 10 shown in FIG. 5 and includes a pair of line terminals 240a and 240b which are connected to the telephone network. The line terminal 240a is connected to an internal terminal 241a through a relay 244a. On the other hand, the other line terminal 240b is connected to another internal terminal 241b through a pair of parallel connected photocouplers 245 and 246 and another relay 244b. It should be noted that the pair of internal terminals 241a and 241b is coupled to the SCU 218 of the facsimile main system 200. The photocoupler 245 is a ringing detecting photocoupler and it includes a photodiode 245a and an associated photodetector 245b. On the other hand, the other photocoupler 246 is an off-hook signal detecting photocoupler and it includes a photodiode 246a and an associated photodetector 246b. The photodetector 245b of the ringing detecting photocoupler 245 has its emitter connected to ground and its collector connected to one input terminal of an OR gate 247. The photodetector 246b of the off-hook detecting photocoupler 246 has its emitter connected to ground and its collector connected to the remaining input terminal of the OR gate 247 whose output terminal is connected to another internal terminal 242 which in turn is connected to the SCU 218. In addition, a pair of telephone terminals 243a and 243b, which is connected to the telephone unit 5 in FIG. 5, is connected to the relays 244a and 244b.

Figure 11:
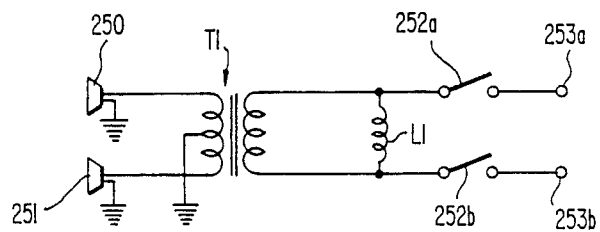
FIG. 11 is a circuit diagram showing a typical electrical structure provided inside of a handset of a telephone unit.

On the other hand, FIG. 11 schematically illustrates the internal electrical structure of the handset of the telephone set 5. As shown, the handset includes a microphone 250, a speaker 251, a transformer T1, a coil L1, a pair of switches 252a and 252b, and a pair of terminals 253a and 253b. It is to be noted that the pair of terminals 253a and 253b is connected to the pair of telephone terminals 243a and 243b, respectively. The pair of switches 252a and 252b is turned on when the handset of the telephone unit 5 is removed from its cradle or hook and they are turned off when the handset is placed on the cradle in position. These switches 252a and 252b are typically operated by an associated relay which is not shown.

With the structure shown in FIGS. 10 and 11, when the operator picks up the handset of the telephone unit 5, the pair of switches 252a and 252b is turned on at the same time, so that a closed circuit is defined through the coil L1, switches 252a and 252b, terminals 253a and 253b, terminals 243a and 243b, relays 244a and 244b, off-hook detecting photocoupler 246 and the telephone terminals 240a and 240b. Thus, the photodiode 246a is activated to produce an off-hook signal at the terminal 242. In the illustrated embodiment, the off-hook signal is set at low level when the off-hook state has been established by removing the handset from its cradle. When the off-hook signal is set at low level, which corresponds to the "ON" state, the SCU 218 shown in FIG. 5 supplies a control signal to the switch circuit 217 thereby to establish a connection to the wire communication terminal a, thereby automatically establishing the wire communication mode. This is because, when the operator wishes to send image information in the wire communication mode through the telephone network, the operator necessarily picks up, in effect, the phone for dialing, thereby causing the off-hook signal to take its "ON" state. The fact that the off-hook signal has taken its "ON" state indicates that the present radio/wire switchable facsimile machine is expected to operate in the wire communication mode. Because of this, the switch circuit 217 establishes a connection to the wire contact a in accordance with a control signal from the SCU 218. When the off-hook signal is turned low as described above, the SCU 218 operates the pair of relays 244a and 244b to switch connection to the telephone network from the external telephone unit 5 to the SCU 218 of the facsimile main system 200. Thus, image information may be transmitted to a destination station through the telephone network.

When a call is received, its ringing signal, e.g., 16 Hz a.c. signal, is detected by the ringing detecting photocoupler 245, so that the photodiode 245a is activated to produce a rectangular waveform. This rectangular waveform is supplied to the SCU 218 through the terminal 242, so that the SCU 218 operates the pair of relays 244a and 244b to establish a connection between the telephone network and the facsimile main system 200. At the same time, the switch circuit 217 is operated to establish a connection to the wire contact a, so that image information may be received through the telephone network.

Figure 12:
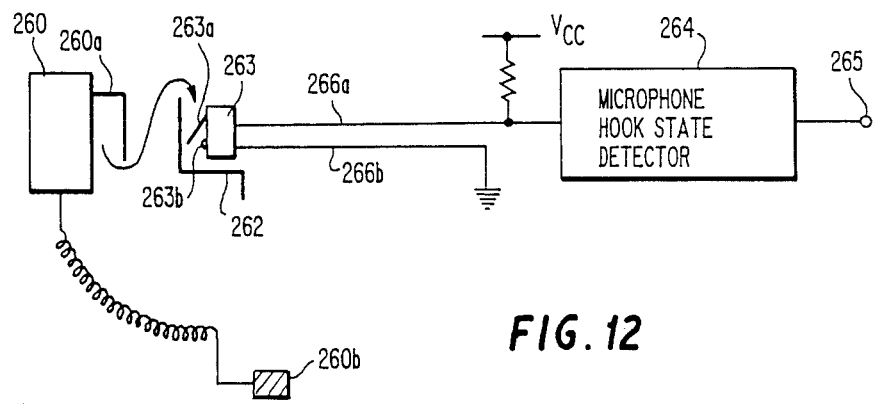
FIG. 12 is a schematic block diagram showing a structure for detecting whether a microphone of a radio set is in an off-hook state or not.

FIG. 12 schematically illustrates another embodiment in which an off-hook signal is produced by the hook state of the microphone 6 rather than the handset of the telephone unit 5. That is, in the embodiment of FIG. 12, the status of the switch circuit 217 is controlled in accordance with an off-hook signal supplied from the radio interface unit 12 instead of the NCU 10. That is, as shown in FIG. 12, a microphone 260 is connected to the radio interface unit 12 through its connector 260b and the microphone 260 is provided with a hook 260a. A hook rest 262 is fixedly provided in space and it is typically provided as attached to a frame of the radio set 100. Thus, the microphone 260 may be set in position with its hook 260a in engagement with the hook rest 262. A micro-switch 263 provided with a feeler 263a and a contact 263b is also fixedly provided in space adjacent to the hook rest 262. The feeler 263a is electrically connected to a line 266a which in turn is connected to a microphone hook state detector 264. The line 266a is normally maintained at a predetermined potential level. The detector 264 has its output coupled to a terminal 265 which is connected to a controller, typically a CPU, provided in the radio set 100 or in the radio interface unit 12. The contact 263b is electrically connected to another line 266b which is grounded.

With the structure shown in FIG. 12, when the radio set 100 is not in use, the microphone 260 is normally kept in position with its hook 260a in engagement with the hook rest 262. In this case, the hook 260a causes the feeler 263a to contact the contact 263b, so that on-hook status of the microphone 260 is detected by the detector 264. On the other hand, when the radio set 100 is to be used, the operator normally picks up the microphone 260 so that the feeler 263a is disconnected from the contact 263b. Thus, the off-hook status of the microphone 260 is detected by the detector 264 when the radio communication is to be carried out. As a result, the off-hook signal is set at high level when the microphone 260 is hooked and the off-hook signal is set at low level when the microphone 260 is unhooked. In this case, depending on the current status of such an off-hook signal, which indicates whether the microphone 260 is hooked or unhooked, the connection status of the switch circuit 217 may be switched by the control signal supplied from the SCU 218 in a manner similar to the previously described embodiment.

As described above, in accordance with the present invention, either one of the wire and radio communication modes is automatically selected depending on the current status of a predetermined signal. Thus, there is no need for the operator to manually operate a turnover switch to establish either the wire communication mode or the radio communication mode selectively. In addition, the operator is not required to check the currently established mode prior to operation. It is to be noted that in the above-described embodiments, different procedural control signals are used between the wire and radio communication modes; however, the same procedural control signals may be used between the wire and radio communication modes, if desired. Besides, use has been made of an off-hook signal for determining an automatic selection between the wire and radio communication modes in the above-described embodiments; however, use may be made of any other desired signal, such as a ready signal which is supplied from a relay unit in response to an off-hook signal, in determining an automatic selection between the wire and radio communication modes.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A communication control apparatus comprising:
   first interface means connectable to a telephone wire communication network;
   second interface means connectable to a radiotelephone wireless communication network which is different from said first communication network in mode of communication;
   processing means for processing data to be transmitted or data received in accordance with a predetermined procedure through said first and second interface means;
   selecting means for selecting one of said first and second interface means to be operatively connected to said processing means; and
   controlling means for controlling the overall operation of said apparatus, said controlling means supplying a selection signal to said selecting means thereby causing said selecting means to select one of said first and second interface means to be connected to said processing means;
   wherein said processing means comprises,
   a MODEM for modulating data to be transmitted through a selected one of said first and second interface means and demodulating data received through a selected one of said first and second interface means.

2. Apparatus of claim 1, wherein said controlling means comprises:
   an operating unit which is operated by an operator to provide an instruction for selecting one of said first and second interface means.

3. Apparatus of claim 1, wherein said processing means further comprises:
   a CODEC for encoding or decoding said data in accordance with a predetermined manner.

4. Apparatus of claim 3, wherein said processing means further comprises:
   optical reading means for optically reading an original document to obtain image data to be transmitted.

5. Apparatus of claim 4, wherein said processing means further comprises:
   recording means for recording said received data on a recording medium.

6. A facsimile machine comprising:
   communication control means for controlling a communication of image data in accordance with a predetermined communication procedure;
   first connection control means for controlling a connection to a wire transmission line;
   second connection control means for controlling a connection to a radio set;
   switching means for switching a connection of said communication control means between said first connection control means and said second connection control means; and
   system control means for controlling the overall operation of said facsimile machine, said system control means being operatively coupled to said first and second connection control means and to said switching means and controlling a connection status of said switching means automatically in accordance with an off-hook signal supplied from either one of said first and second connection control means.

7. The facsimile machine of claim 6, wherein said off-hook signal is supplied from said first connection control means which is connected to a telephone unit, wherein said off-hook signal has a first state when a handset of said telephone unit is in a hooked state and a second state, which is different from said first state, when said handset is in an unhooked state, said system control means causing said switching means to establish a connection between said communication control means and said first connection control means when said off-hook signal has said second state.

8. The facsimile machine of claim 6, wherein said first connection control means includes a net control unit which supplies said off-hook signal to said system control means.

9. The facsimile machine of claim 6, wherein said off-hook signal is supplied from said connection control means which is connected to said radio set and to a microphone, wherein said off-hook signal has a first state when said microphone is in a hooked state and a second state, which is different from said first state, when said microphone is in an unhooked state, said system control means causing said switching means to establish a connection between said communication control means and said second connection control means when said off-hook signal has said second state.

10. The facsimile machine of claim 9, wherein said second connection control means includes a radio interface unit which supplies said off-hook signal to said system control means.

* * * * *